United States Patent
Tiede et al.

(10) Patent No.: US 6,418,375 B2
(45) Date of Patent: Jul. 9, 2002

(54) NAVIGATION METHOD USING A SMALL VOLUME OF DATA

(75) Inventors: Lutz Tiede, Lappersdorf; Jürgen Leimbach, Regensburg, both of (DE)

(73) Assignee: Mannesmann VDO AG (DE)

( * ) Notice: Subject to any disclaimer, the term of this patent is extended or adjusted under 35 U.S.C. 154(b) by 0 days.

(21) Appl. No.: 09/796,028

(22) Filed: Feb. 28, 2001

(30) Foreign Application Priority Data

Mar. 3, 2000 (DE) .......................................... 100 10 608

(51) Int. Cl.[7] ............................................. G01C 21/00
(52) U.S. Cl. ........................ 701/209; 701/210; 701/213
(58) Field of Search ................................ 701/209, 210, 701/208, 213, 211, 214, 212, 36, 217; 340/990, 995

(56) References Cited

U.S. PATENT DOCUMENTS

| | | | | |
|---|---|---|---|---|
| 6,166,698 A | * | 12/2000 | Turnbull et al. | ............. 701/213 |
| 6,199,009 B1 | * | 3/2001 | Meis et al. | ................. 701/210 |
| 6,275,231 B1 | * | 8/2001 | Obradavich | .................. 701/36 |
| 6,282,496 B1 | * | 8/2001 | Chowdharg | ................. 701/213 |
| 6,324,592 B1 | * | 11/2001 | Hindman | ..................... 701/217 |

FOREIGN PATENT DOCUMENTS

| | | | |
|---|---|---|---|
| DE | 38 01 888 A1 | 8/1989 | ............. G08G/1/09 |
| DE | 195 39 641 A1 | 4/1997 | ............. G08G/1/09 |
| DE | 197 50 778 A1 | 6/1998 | ......... G08G/1/0962 |
| DE | 198 10 173 A1 | 10/1999 | ........... G01C/21/14 |
| DE | 198 16 585 A1 | 10/1999 | ......... G08G/1/0968 |

OTHER PUBLICATIONS

US 6,292,740, 09/2001, Kohli (withdrawn)*

* cited by examiner

*Primary Examiner*—Richard M. Camby
(74) *Attorney, Agent, or Firm*—David M. Thimmig; Mayer Brown Rowe & Maw

(57) ABSTRACT

The invention provides a method of routing using an off-board navigation system for motor vehicles, in which road points, at which there is a road junction, and also the road distance between adjacent road points on a calculated route are stored in a memory element in the vehicle. Preferably, only those road points which are also turnoff points are stored. The distance from the next turnoff point at which a turnoff maneuver is to be effected is determined by comparing the distance covered since the last turnoff point with a stored value for the road distance between the adjacent turnoff points. If a minimum value for the distance from the next turnoff point has not been reached, a driving instruction is output. The method requires only a small volume of data and an odometer for position finding.

20 Claims, 2 Drawing Sheets

NAVIGATION METHOD USING A SMALL VOLUME OF DATA

BACKGROUND OF THE INVENTION

The invention relates to a method of routing using a motor vehicle navigation system.

Navigation systems are increasingly being supplied for new vehicles or as retrofitted systems. In this context, a distinction is drawn between so-called onboard and offboard navigation systems. Onboard navigation systems are largely autonomous systems in which digital road map data are carried in the vehicle for route calculation, and the route calculation itself is also carried out by the control unit in the navigation system. In contrast to this, offboard navigation systems have no memory element for extensive road map data. Instead, in these systems, the route planning request is transmitted to a central station which stores the digital road map. Parts of the digital road map can then be transmitted to the motor vehicle and routing can be effected there, or the route calculation is performed in the central station and road points are transmitted to the vehicle with routing instructions. In this context, transmission usually takes place over a mobile radio link, but beacon systems are also known.

DE 195 44 157 C2 discloses a method of reliable routing for a vehicle, in which a route in the form of successive road points is determined and is indicated to the driver of the vehicle in the form of driving instructions. In this method, the position is ascertained in the vehicle using signals from a satellite navigation system (e.g., GPS system), and a comparison is continually made between the distance from the current position to the road point which the vehicle will pass next on its route and a prescribed minimum value. Detection of the position by a satellite navigation system is currently possible only with a limited degree of accuracy, however. This means that uncertainties arise with regard to the approach to the next road point. Although determination of the position by means of GPS navigation can be improved using DGPS systems, this is a complex method. In addition, in the method disclosed in DE 195 44 157 C2, comparison of the distance as the crow flies between the current position of the vehicle and the next road point on the basis of the specific route is sometimes very inaccurate, e.g., on mountain roads with many bends.

EP 0 674 007 B1 discloses a vehicle navigation system in which the digital road map data is carried in the vehicle itself. The road map data is stored in simplified form as nodes, with nodes which are connected to one another by real roads additionally having the distance between these nodes stored for them. The exact road shape, as is otherwise usually available in the road map data in onboard navigation systems, cannot be reconstructed in this case, but the memory requirement is significantly reduced.

SUMMARY OF THE INVENTION

It is an object of the invention to specify a method of routing using a motor vehicle navigation system which both requires only a small volume of data to be transmitted to the motor vehicle and at the same time ensures that driving instructions are output accurately for the position.

The object is achieved by a method of routing using a navigation system which contains, in the vehicle, a control unit and also an input unit and output unit which are connected to the control unit, an odometer and also a communication appliance for communicating with a central station which is located outside the vehicle and contains a digital road map, where a starting point and a destination are used to calculate a route using the data of the digital road map, characteristic road points, at which there is a road junction, and also the road distance between adjacent characteristic road points on the route are stored in a memory element in the vehicle, on reaching a characteristic road point, a distance comparison between the distance from the road point reached to the next road point and the distance traveled from the road point reached is started, and then the distance from the last road point reached is continually ascertained by the odometer in the vehicle, and the distance ascertained in this manner is compared with the stored distance between the last road point reached and the next road point on the route, and also if a minimum value for the distance from the next road point has not been reached, a driving instruction is output.

The method according to the invention is thus based on a navigation system in which no digital road map is required in the vehicle itself. A digital road map is located in a central station, and the central station may be one which can be accessed by a multiplicity of motor vehicle drivers or may be a home PC (personal computer) with a route planning program. In the central station, the starting point and the destination are used to calculate a route using the data of the digital road map. The result of this route calculation is a list containing characteristic road points, at which there is a road junction, and the respective road distance between adjacent characteristic road points on the calculated route. Information about the exact shape of the road between the characteristic road points is not required. The characteristic road points are stored, together with the associated road distances, in a memory element in the navigation system in the vehicle. To determine the distance from the next characteristic road point, the distance covered since the last characteristic road point is compared with the stored distance between the last road point and the next road point. If this establishes that the distance of the vehicle from a next road point has reached a prescribed minimum value, then the next driving instruction is output.

The method according to the invention thus firstly requires only a very small volume of data needing to be transmitted to the vehicle and, for position finding during the journey, can do without a satellite navigation system. Instead, the position of the vehicle in relation to the next road point is determined preferably merely using the values from the odometer and from the comparison with the stored road distance.

The volume of data to be transmitted to the vehicle can be reduced still further if not all the road points on the route at which there is a road junction are transmitted to the vehicle, but only those road points which are turnoff points on the calculated route. Hence, in this embodiment, those road points at which, although there is a road junction, the calculated route carries straight on are not transmitted to the vehicle. In this case, the volume of data can be significantly reduced particularly in urban areas with a very large number of minor roads branching off from a main road.

In a further preferred embodiment, the distance from the next turnoff point is output in the vehicle. This information can actually be output immediately after a turnoff maneuver has been completed and can thus actually indicate the distance from the next turnoff point in good time. Such a method is advantageous particularly if the individual turnoff points are relatively far apart. In this case, the indication of the distance can signal to the driver that another turnoff point is not to be expected in the near future. This is conducive to more relaxed driving.

The route may, for example, be calculated on the home PC, and data are simply transmitted to the vehicle.

In one specific embodiment, the starting point and the destination are transmitted from the vehicle to the central station, the route is calculated outside the vehicle and the characteristic road points are subsequently transmitted to the vehicle. A particular preference in this context is an inherently known mobile radio link to a central station. In this case, the starting point as well as the destination can be selected from a list by the vehicle driver directly in the vehicle.

In an alternative embodiment to this, the starting point is determined by satellite navigation. This also allows the method to be used whenever the driver does not know his exact starting position. Although satellite navigation can also be used in addition to the odometer to determine the vehicle position during the journey, preference is given to an embodiment in which the odometer is the only means used to determine the distance from the next road point.

Unambiguous detection of a turnoff maneuver is very important for the method according to the invention. The approach to a turnoff point is detected by means of the distance comparison described above. To be able to detect the turnoff maneuver with pinpoint accuracy, the navigation system preferably has a direction sensor. Evaluation of the output signal from the direction sensor permits reliable detection of a turnoff maneuver, which is linked to an appropriately large change of direction. If the turnoff maneuver is detected, then the distance calculation to the next turnoff point is started again.

In order to have the best route to the destination available at all times, even in different traffic conditions, current traffic information is preferably taken into account during route calculation. This traffic information may be located in the central station, for example. The traffic information is then taken into account directly when the route inquiry is made.

However, in order to be able to take into account changing traffic conditions as well during routing, provision is also made for the road points and the distances between the road points to be updated by route recalculation as the traffic situation changes. If the motor vehicle and the central station are connected by means of a mobile radio link, then, to take account of a traffic situation which has changed, the communication appliance in the motor vehicle, e.g., a mobile radio telephone, can set up a connection to the central station automatically, for example, at periodic intervals and can check whether there is any new traffic information affecting the planned route.

However, since the complete route calculation can be performed in the central station, the route itself can also be stored in the central station, which means that the central station can use the start of the journey and the planned route to decide whether new traffic information may be of importance for the vehicle concerned. Should this be the case, then the central station can also automatically set up a new connection to the motor vehicle and can transmit a newly calculated route with the changed road points to the vehicle. To this end, the mobile radio telephone in the motor vehicle can be constantly connected to the control unit of the navigation system by means of a cable connection.

In one particular embodiment, however, the data received by the mobile radio are transmitted to the control unit of the navigation system over a short-haul radio link. This can be done, in particular, using the inherently known Bluetooth method. In this context, the mobile radio telephone can remain in a pocket in the vehicle, for example.

The driving instructions are preferably output audibly to the vehicle driver in the motor vehicle. To keep the number of additionally required components in the motor vehicle as small as possible, the loudspeaker system, in particular, of an audio system which is present in the vehicle anyway can also be used in this context.

To ensure reliable routing, it is of particular importance to output the driving instructions to the vehicle driver in good time. In this context, the distance, in particular, at which the driving instructions are output before the turnoff point may be speed dependent, so that, at high speed, the driving instructions are output at a greater distance from the turnoff point than at a lower speed.

BRIEF DESCRIPTION OF THE DRAWINGS

The invention is explained in more detail below with the aid of an illustrative embodiment and the drawing, in which.

DETAILED DESCRIPTION OF THE PREFERRED EMBODIMENT

Figure 1:
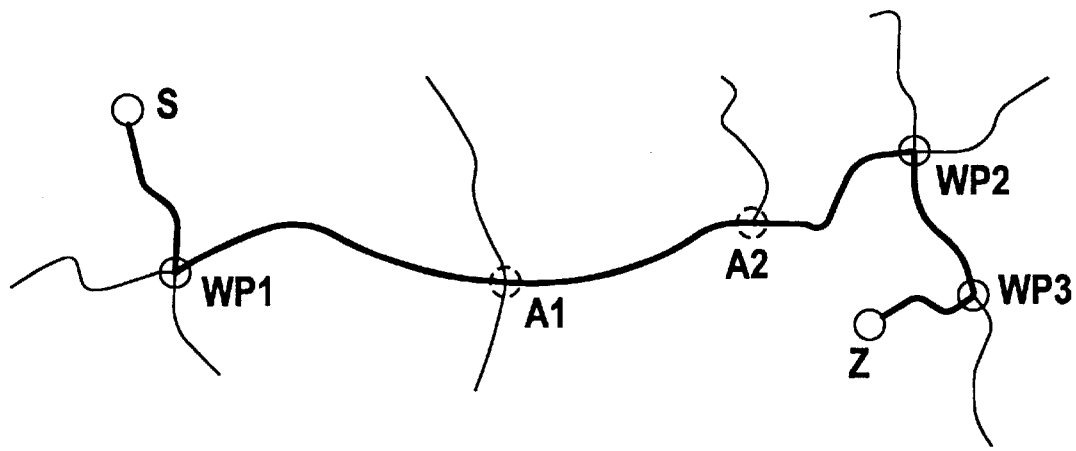
FIG. 1 shows a road map section.

FIG. 1 shows a road map section for a journey from a starting point S to a destination Z. In this case, the route runs via road points WP1, A1, A2, WP2 and WP3 to the destination Z. Turnoff maneuvers need to be made at road points WP1, WP2 and WP3, whereas at A1 and A2 the journey continues without any turnoff maneuver.

Figure 2:
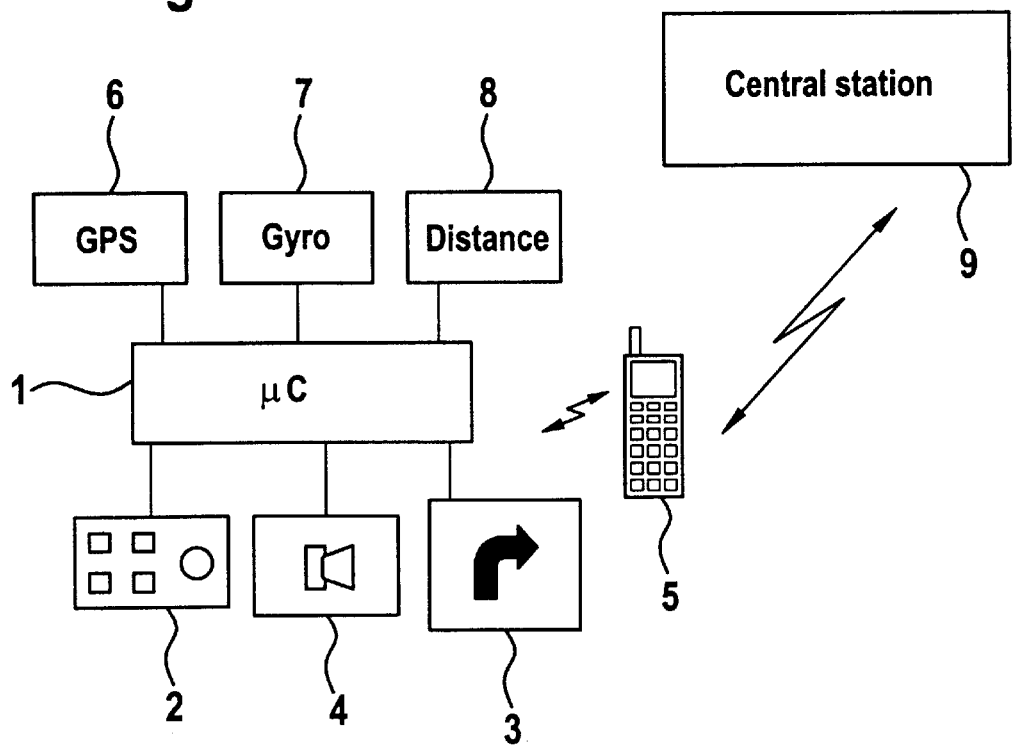
FIG. 2 shows the components of a navigation system.

FIG. 2 shows the basic components of a navigation system for carrying out the method according to the invention. The central part of the navigation system in the vehicle is the control unit 1. Connected to the control unit 1 is the input unit 2, which is used to enter the destination.

The starting point, which is the same as the present vehicle position, is ascertained by means of a GPS satellite receiver 6. The control unit 1 contains a transmission and reception station for a short-haul radio link to a communication appliance 5, such as a mobile radio telephone. The starting point and the desired destination are transmitted to the mobile telephone 5 over the short-haul radio link.

Once a connection to a central station 9, storing a digital road map, outside the vehicle has been dialed automatically or manually by the communication appliance 5, the starting point and the destination are transmitted to the central station 9. A route calculation is now performed in the central station 9, and the road points on the route at which there is a road junction are determined. In the case of the example shown in FIG. 1, these are the road points WP1, A1, A2, WP2 and WP3. No turnoff maneuvers are required at road points A1 and A2, which means that these road points are preferably removed from the route list, and only turnoff points WP1, WP2 and WP3 remain as characteristic road points. The central station 9 thus uses the mobile radio unit 5 to transmit to the control unit 1 in the motor vehicle the data required for routing at the turnoff points WP1, WP2 and WP3, and also the distance between adjacent turnoff points.

The navigation system in the vehicle also has an odometer 8 and a direction sensor 7. The direction sensor 7 can be used to record the exact position of a turnoff maneuver at a turnoff point, so that the distance from the next turnoff point can then be recalculated using the signals from the odometer 8. Routing instructions can be output both via a visual output unit 3 and via an audio output unit 4.

Figure 3:
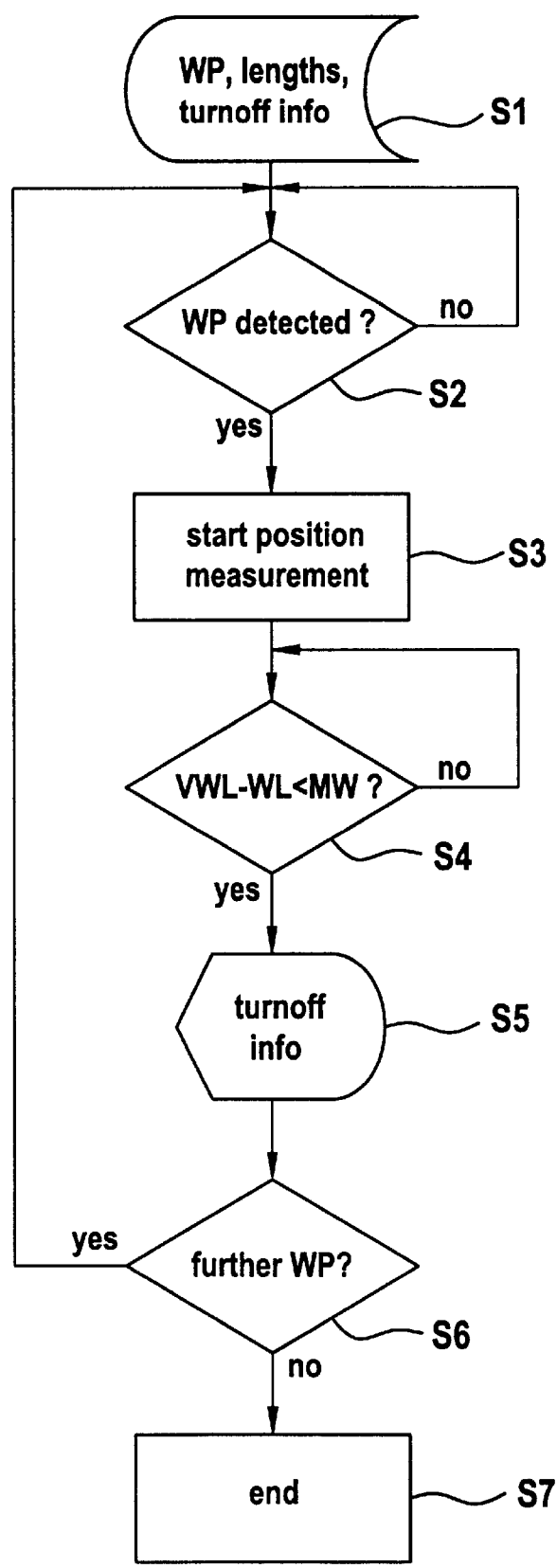
FIG. 3 shows a flowchart for the method according to the invention.

The method carried out during the journey is explained in more detail below with the aid of FIG. 3. In this case, it is assumed that the information about the turnoff points WP1, WP2 and WP3 and also the road distance between adjacent turnoff points are stored in the memory element of the control unit 1 (step S1). In the explanations below, it is also assumed that the vehicle is in the immediate vicinity of a turnoff point. In step S2, a check is therefore carried out to determine whether the turnoff point has been detected by means of the direction sensor. If this is the case, i.e. if the turnoff maneuver has been performed, then position measurement starts (step S3). The difference is then continually formed between the stored road distance VWL (preset value for the road length) from the road point just passed to the next road point and the road length WL measured since the last road point. This difference is compared with a preset value MW (step S4). If the calculated difference is less than the preset value, i.e. the distance between the vehicle and the next turnoff point has not reached the preset value, the information about the next turnoff maneuver is subsequently output in step S5. A check is then carried out in step S6 to determine whether there is another road point. If this is not the case, then the method is ended. If there is another road point, then, starting with step S2, a check is again carried out to determine whether the road point to which the turnoff information associated with step S5 refers has been detected, and the method starts again.

Position measurement is also started immediately after starting at the starting point S, in order to be able to reach the characteristic road point WP1 reliably and to output the appropriate turnoff information in good time. The method to be carried out in this early phase of routing differs from the method described in FIG. 3 merely in that the method step S2 can be omitted, and departure of the vehicle can be regarded as detection of the first road point, which is the same as the starting point S.

Although reference has been made, for the purpose of explanation, to a preferred embodiment of a navigation method using a small volume of data, it will be apparent to those skilled in the art that modifications and variations can be made in the design and construction of the system and in the navigation method without departing from the scope or spirit of the invention. Other embodiments of the invention will be apparent to those skilled in the art from consideration of the specification and practice of the invention disclosed herein.

What is claimed is:

1. A method of routing a vehicle using a navigation system in the vehicle which comprises a control unit, and an input unit and an output unit which are connected to the control unit, an odometer, and a communication appliance for communicating with a central station which is located outside the vehicle and contains a digital road map having data, comprising the steps of:
    calculating a route using a starting point and a destination and the data of the digital road map, wherein characteristic road points, at which there is a road junction, and the road distance between adjacent characteristic road points on the route are stored in a memory element in the vehicle,
    on reaching a characteristic road point, beginning a distance comparison between a distance from the road point reached to the next road point and a distance traveled from the road point reached,
    wherein the distance from the last road point reached is continually ascertained by the odometer in the vehicle, and the distance ascertained in this manner is compared with a stored distance between the last road point reached and the next road point on the route, and
    if a minimum value for the distance from the next road point has not been reached, a driving instruction is output.

2. The method of claim 1, wherein the road points are exclusively turnoff points on the calculated route.

3. The method of claim 2, wherein the distance from the next turnoff point is output.

4. The method of claim 1, wherein the odometer is the only means used to determine the distance from the next road point.

5. The method of claim 1, wherein the starting point and the destination are transmitted from the vehicle to the central station, the route is calculated outside the vehicle and the characteristic road points are transmitted to the vehicle.

6. The method of claim 1, wherein the starting point is ascertained by satellite navigation.

7. The method of claim 1, wherein a turnoff maneuver at a road point is recognized by means of a direction sensor.

8. The method of claim 1, wherein current traffic information is taken into account for route calculation.

9. The method of claim 8, wherein the road points and the distances between the road points are updated by route recalculation as traffic situations change.

10. The method of claim 1, wherein the output device is part of an audio system.

11. The method of claim 1, wherein the communication appliance transmits received data to the control unit over a short-haul radio link.

12. The method of claim 1, wherein the minimum value for the distance at which a driving instruction is output when it has not been reached is prescribed depending on speed.

13. A method of routing a vehicle using a navigation system in the vehicle which comprises a control unit, and an input unit and an output unit which are connected to the control unit, an odometer, and a communication appliance for communicating with a central station which is located outside the vehicle and contains a digital road map having data, comprising the steps of:
    calculating a route outside the vehicle using a starting point and a destination which are transmitted from the vehicle to the central station, and the data of the digital road map, wherein characteristic road points are transmitted to the vehicle, said characteristic road points representing a road junction, and a road distance between adjacent characteristic road points on the route are stored in a memory element in the vehicle,
    on reaching a characteristic road point, beginning a distance comparison between a distance from the road point reached to the next road point and a distance traveled from the road point reached,
    wherein the distance from the last road point reached is continually ascertained by the odometer in the vehicle, and the distance ascertained in this manner is compared with a stored distance between the last road point reached and the next road point on the route, and
    if a minimum value for the distance from the next road point has not been reached, a driving instruction is output.

14. The method of claim 13, wherein the road points are exclusively turnoff points on the calculated route.

15. The method of claim 14, wherein the distance from the next turnoff point is output.

16. The method of claim 13, wherein the starting point is ascertained by satellite navigation.

17. A method of routing a vehicle using a navigation system in the vehicle which comprises a control unit, and an input unit and an output unit which are connected to the control unit, an odometer, and a communication appliance for communicating with a central station which is located outside the vehicle and contains a digital road map having data, comprising the steps of:

- calculating a route using a starting point and a destination and the data of the digital road map, wherein characteristic road points, at which there is a road junction, and the road distance between adjacent characteristic road points on the route are stored in a memory element in the vehicle,
- on reaching a characteristic road point, beginning a distance comparison between a distance from the road point reached to the next road point and a distance traveled from the road point reached,
- wherein the distance from the last road point reached is continually ascertained by the odometer in the vehicle, and the distance ascertained in this manner is compared with a stored distance between the last road point reached and the next road point on the route,
- if a minimum value for the distance from the next road point has not been reached, a driving instruction is output, and
- wherein current traffic information is taken into account for route calculation.

18. The method of claim 17, wherein the road points and the distances between the road points are updated by route recalculation as traffic situations change.

19. The method of claim 17, wherein the road points are exclusively turnoff points on the calculated route.

20. The method of claim 17, wherein the starting point is ascertained by satellite navigation.

* * * * *